No. 728,325. PATENTED MAY 19, 1903.
C. W. STONE.
SYSTEM OF ELECTRICAL DISTRIBUTION.
APPLICATION FILED OCT. 23, 1901.
NO MODEL.
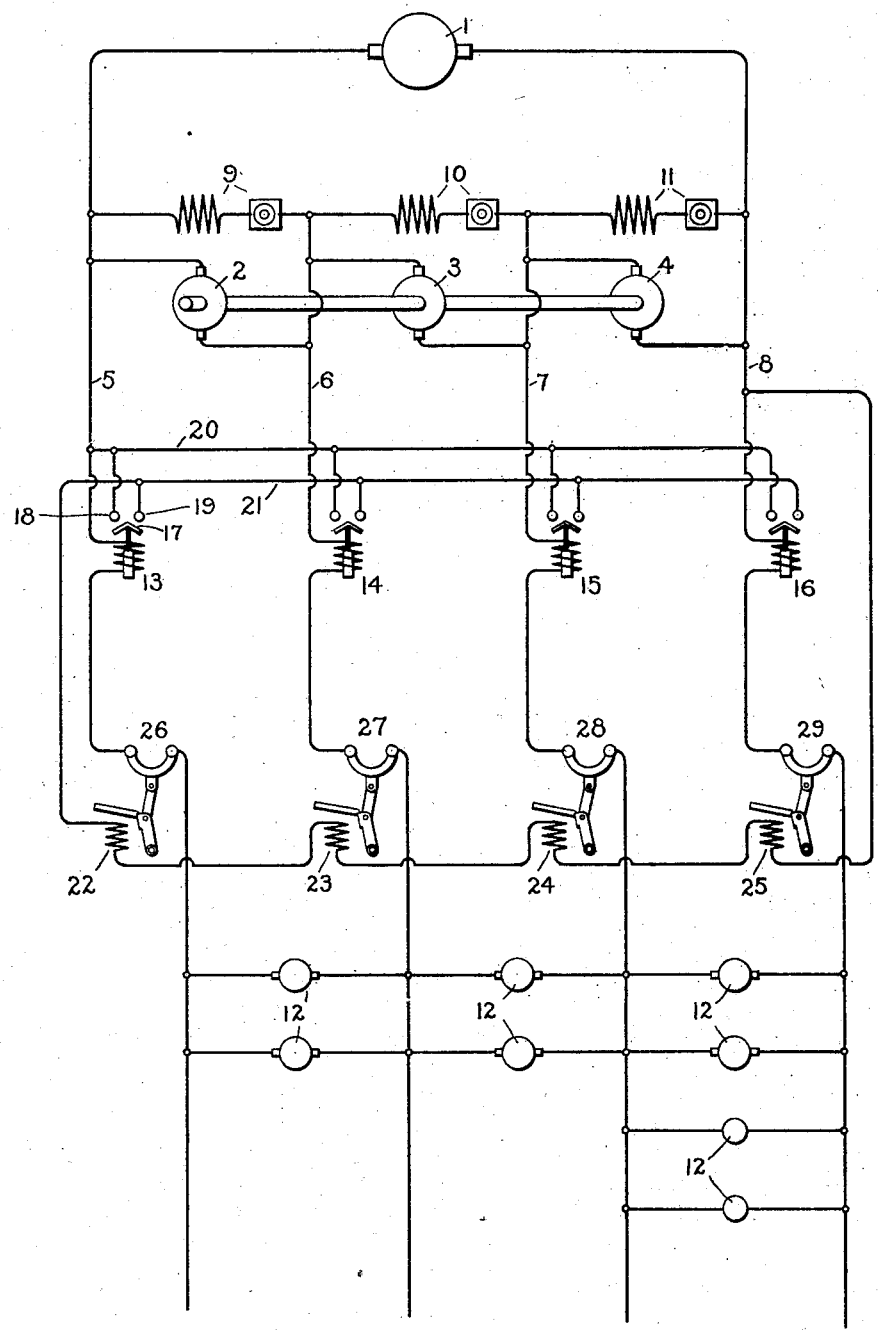
Witnesses.
John Ellis Glenn.
Benjamin B. Hull.
Inventor.
Charles W. Stone.
by Albert G. Davis
Atty.

No. 728,325. Patented May 19, 1903.

UNITED STATES PATENT OFFICE.

CHARLES W. STONE, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 728,325, dated May 19, 1903.

Application filed October 23, 1901. Serial No. 79,654. (No model.)

*To all whom it may concern:*

Be it known that I, CHARLES W. STONE, a citizen of the United States, residing at Schenectady, county of Schenectady, State of New York, have invented certain new and useful Improvements in Systems of Electrical Distribution, of which the following is a specification.

My present invention relates more especially to circuit-controlling means for multiple-conductor electric systems.

The novel features which characterize the invention I have set forth with particularity in the appended claims.

For a description of my invention in detail and of its mode of operation reference is to be had to the following specification, taken in connection with the accompanying drawing, which represents in diagram one of the various embodiments which my invention may assume.

The drawing represents my invention as applied to a multiple-conductor direct-current system of electrical distribution in which the electromotive force derived from a single source of direct current, such as the direct-current generator 1, is subdivided by the use of a set of balancing-machines 2 3 4, operating in the usual manner, the resulting differences of potential being maintained between the mains 5 6 7 8 of the distribution system. The balancing set referred to consists, as shown in the present instance, of three direct-connected direct-current machines 2 3 4, the armatures of which are connected in series with each other across the outside mains 5 8. Each machine is provided with a field-winding and a regulating-rheostat, these windings and rheostats being jointly represented at 9, 10, and 11, respectively. The mains of the distribution system supply current to translating devices of any suitable character, such devices being indicated conventionally at 12. In case any one of the mains becomes overloaded I have provided means responsive to such overload for simultaneously opening the circuits of all of the mains. To secure this result, I connect in series with the several mains magnetic circuit-closing devices 13, 14, 15, and 16. Each of these devices consists of a coil in series with the main in connection with which it operates, and within the influence of the field produced by current in this coil is a magnetic core which by its attraction moves a bridging contact, so as to close the circuit between two fixed contacts. For example, at 17 is shown one of these bridging contacts which acts to close the circuit between the two fixed contacts 18 and 19. Each of the circuit-closing devices 13, 14, 15, and 16 is of similar construction, and each is provided with a pair of fixed contacts and a bridging contact therefor operated when current of excessive value flows in the coil of the circuit-closing device. One contact of each pair of fixed contacts is connected to one terminal of a suitable source of current—as, for example, to a lead 20, extending from the outside main 5 of the distribution system. Each of the remaining fixed contacts is connected to a lead 21, which includes in series the tripping-coils 22, 23, 24, and 25 of circuit-breakers for the respective mains of the distribution system. The lead 21 after including these tripping-coils is connected to the remaining terminal of the source of current referred to—in this case to the other outside main 8 of the distribution system. The circuit-breakers, of which the tripping-coils 22 to 25 form a part, are represented, respectively, at 26 to 29, inclusive, these circuit-breakers being operatively connected to the respective mains 5 to 8, inclusive. The drawing represents merely a conventional idea of a circuit-breaker; but it will be understood that in practice circuit-breakers of any desired or well-known character may be employed.

In case of overload on any of the mains of the distribution system the circuit-closing device corresponding to the overloaded main will operate to bridge the circuit between the pair of fixed contacts corresponding thereto, thereby closing the circuit of the tripping-coils of all of the circuit-breakers above referred to. The resulting simultaneous action of all of the circuit-breakers therefore causes a simultaneous opening of all of the circuits of the systems.

What I claim as new, and desire to secure by Letters Patent of the United States, is—

1. The combination of a multiple-conductor system of electrical distribution, electromagnetically-tripped circuit-breakers one for each of a plurality of the conductors of said system, circuit-closing devices for those conductors of said system for which circuit-breakers are provided, and connections whereby the operation of any one of said circuit-closing devices energizes the tripping-coils of the circuit-breakers.

2. The combination of a plurality of electrical conductors, means for supplying direct current thereto, a magnetically-actuated circuit-closing device for each conductor, a circuit-breaker for each conductor, and electromagnetic means controlled by the operation of any one of said circuit-closing devices for simultaneously tripping all of said circuit-breakers.

3. The combination of a multiple-conductor electric system, a circuit-breaker for each of a plurality of said conductors, a tripping-coil for each circuit-breaker, a circuit-closing device for each of a plurality of said conductors operating independently of said circuit-breakers, and connections whereby the tripping-coils of said circuit-breakers are simultaneously energized by current from said system when any one of said circuit-closing devices acts.

In witness whereof I have hereunto set my hand this 17th day of October, 1901.

CHARLES W. STONE.

Witnesses:
BENJAMIN B. HULL,
CHARLES STEINER.